United States Patent [19]

Duncan

[11] Patent Number: 4,507,228
[45] Date of Patent: Mar. 26, 1985

[54] PARTIAL HYDROGENATION OF TALL OIL ROSIN

[75] Inventor: Don P. Duncan, Mt. Pleasant, S.C.

[73] Assignee: Westvaco Corporation, New York, N.Y.

[21] Appl. No.: 475,482

[22] Filed: Mar. 15, 1983

[51] Int. Cl.³ .............................. C09F 1/00; C09F 7/00
[52] U.S. Cl. .................................. 260/97.6; 260/97.7; 260/98; 260/100
[58] Field of Search ...................... 260/97.6, 97.7, 98, 260/100

[56] References Cited

U.S. PATENT DOCUMENTS

| | | | |
|---|---|---|---|
| 2,331,915 | 10/1943 | Kirkpatrick | 252/208 |
| 2,346,793 | 4/1944 | Schultz et al. | 260/100 |
| 2,367,287 | 1/1945 | Kirkpatrick | 260/100 |
| 2,540,582 | 2/1951 | Hockberger | 260/100 |
| 2,727,885 | 12/1955 | Hoffmann et al. | 260/97.5 |
| 2,776,276 | 1/1957 | Glasebrook et al. | 260/100 |
| 3,489,740 | 1/1970 | Cholet et al. | 260/97.7 |
| 3,595,887 | 7/1971 | Kulkarni et al. | 260/409 |
| 3,655,635 | 4/1972 | Sanderson | 260/97.7 |
| 4,163,750 | 8/1979 | Bird et al. | 260/409 |

OTHER PUBLICATIONS

I. T. Masalykin, "Industrial Production of Hydrogenated Rosin on a Palladium Catalyst", *Maslob.-Zhir. Prom.*, 30 (8), 36-38 (1964).
S. Zhao et al., "Report of a Pilot Scale Experiment on Continuous Hydrogenation of Rosin", *Linchan Huaxue Yu Gongye 1*, No. 1: 1-12 (Mar. 1981).
W. E. Shaefer, "Quantitative Hydrogenation of the Principal Unsaturated Components of Turpentine", *Industrial and Engineering Chemistry*, (Analytical Edition), vol. 2, No. 1, (Jan. 15, 1930), pp. 115-117.
J. B. Montgomery et al., "Catalytic Perhydrogenation of Rosin", *Industrial and Engineering Chemistry*, vol. 50, No. 3, (Mar. 1958), pp. 313-316.
M. Zajcew et al., "Platinum Metal Catalysis in Tall Oil Processing", *Engelhard Industries, Inc. Technical Bulletin*, 2 (1) 23 (1961).

*Primary Examiner*—Herbert S. Cockeram
*Attorney, Agent, or Firm*—Terry B. McDaniel; Richard L. Schmalz

[57] ABSTRACT

Partial hydrogenation and sulfur reduction of tall oil rosin process is disclosed whereby the olefinic double bonds of the tall oil rosin resin acid mixture are selectively hydrogenated without reduction of the dehydroabietic acid aromatic double bonds by contacting the tall oil rosin with hydrogen in the presence of a palladium on carbon catalyst under conditions of pressure and temperature to produce a partially hydrogenated tall oil rosin of reduced sulfur content and an acid number no lower than 160.

7 Claims, 1 Drawing Figure

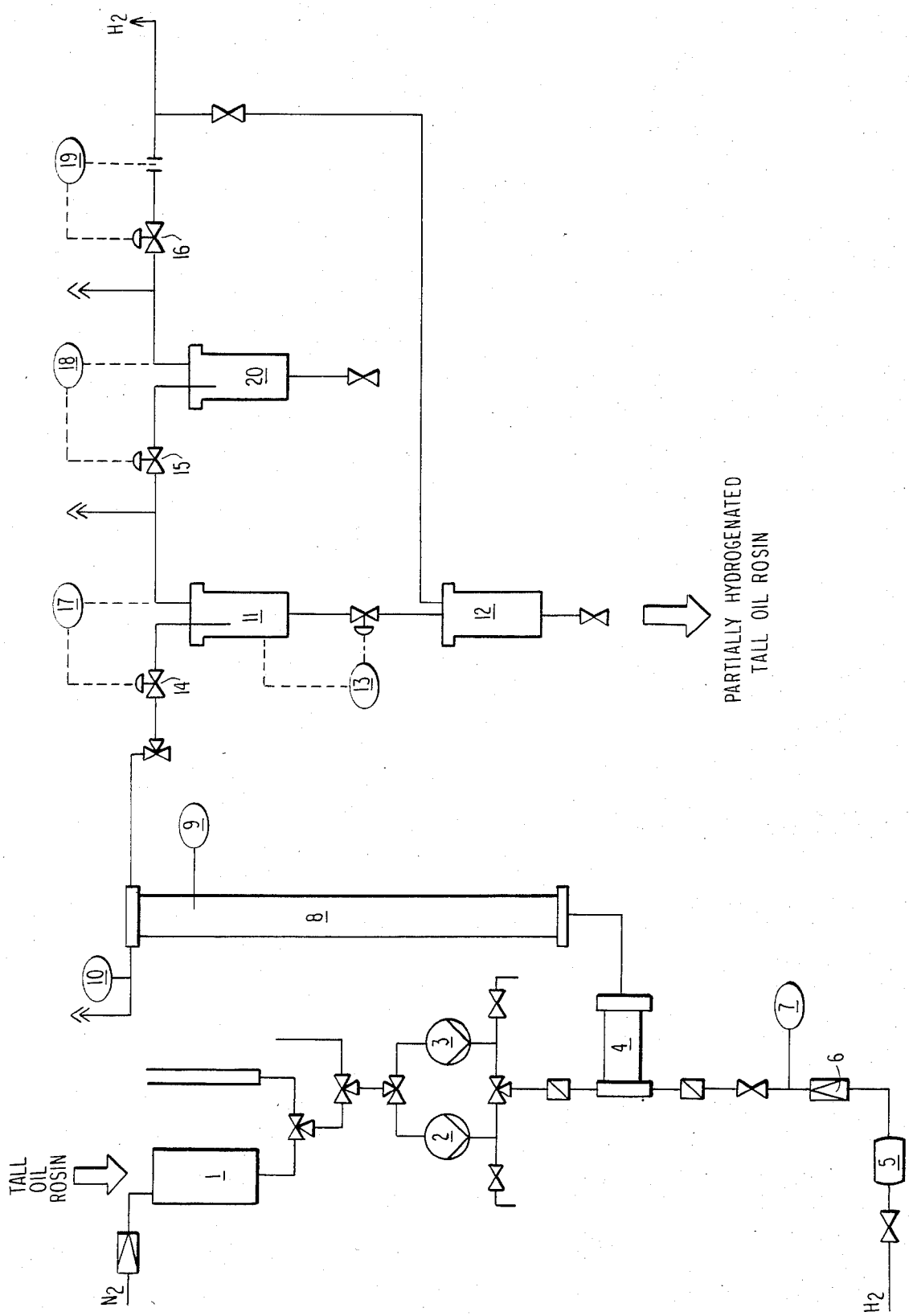

PARTIAL HYDROGENATION OF TALL OIL ROSIN

BACKGROUND OF THE INVENTION (1) Field of the Invention

This invention relates to the catalytic hydrogenation of tall oil rosin. More particularly, this invention involves the partial hydrogenation and sulfur reduction of tall oil rosin in the presence of a palladium catalyst.

(2) Description of the Prior Art

The catalytic hydrogenation of rosin using both base metal catalysts and noble metal catalysts is known. The rosins for which economical commercial processes have been developed are of either the wood or gum variety. Wood rosins are obtained by solvent extraction from the stumps of the Jeffrey and Ponderosa pines, distilling off the volatile fraction. Gum rosin is the residue obtained after the distillation of turpentine oil from crude turpentine oleoresin.

Tall oil rosin, to which this invention relates, is a product in the fractionation of tall oil which is extracted from the black liquor resulting from alkaline pulping processes. While all rosins are composed of resin acids of the abietic and pimaric types and an unsaponifiable portion, these constituents vary greatly according to the source of rosin, i.e., wood, gum or tall oil.

Because of its complex mixture of several isomers and poorly characterized non-rosin impurities (unsaponifiable portion may be up to 15% of the total), tall oil rosin is particularly difficult to hydrogenate. The considerable impurities contribute to poor color characteristics and act to poison the hydrogenation catalyst. During hydrogenation, the rosin may undergo decarboxylation and isomerization and these reactions are competitive to hydrogenation. The decarboxylation leads to a loss of acid number and softer products that fume when heated. Isomerization leads to rosin isomers that are resistant to hydrogenation.

Tall oil rosin's resistance to hydrogenation is taught in U.S. Pat. No. 2,776,276 which recommends pre-treating tall oil rosin prior to hydrogenating to remove catalyst poisoning constituents. No pre-treatment is suggested for wood or gum rosins. The patent teaches hydrogenation with a 5% palladium-on-activated charcoal catalyst at a temperature of from 125° C. to 300° C. and a pressure of at least 3000 psig to produce a substantially completely hydrogenated product, which is defined as a hydrogenated rosin which has absorbed at least 1.22% hydrogen based on the unhydrogenated rosin. A palladium to rosin ratio as small as 1:2000 on a parts by weight basis is taught for anhydrous conditions.

The patentees also published "Catalytic Perhydrogenation of Rosin" in *Industrial and Engineering Chemistry*, Vol. 50, No. 3, 313–316, March 1958. Perhydrogenation is defined as meaning the hydrogenation of all double bonds and aromatic rings, leaving only tetrahydroabietic type acids and no dehydroabietic acids. The perhydrogenation reaction conditions employed are identical to those recommended in the patent, and, therefore, "substantially complete hydrogenation" in the patent refers to hydrogenation of dehydroabietic acid also. This is consistent with the 1.22% minimum hydrogen absorption specified in the patent.

It is an object of this invention to provide a process for partially hydrogenating tall oil rosin in a single hydrogenation step without tall oil rosin pre-treatment. The process may be operated in either a batch or continuous mode. The partial hydrogenation of tall oil rosin is achieved by the selective reduction of only olefinic double bonds; thus, the invention process does not involve saturation of the dehydroabietic acid aromatic double bonds.

A further potential hindrance to hydrogenation which is somewhat unique to tall oil rosin is its considerable sulfur content, attributable to its derivation from kraft pulping liquors. Sulfur compounds are taught as catalyst poisons in the above discussed paper on perhydrogenation, in U.S. Pat. No. 3,655,635 with respect to tall oil rosin, and in U.S. Pat. No. 2,727,885, with respect to unfractionated tall oil. Inasmuch as sulfur may be an undesirable end product constituent for certain applications, its removal may be beneficial for reasons other than catalyst affinity, as discussed in U.S. Pat. No. 3,489,740.

The economics of any catalytic process may be drastically affected by catalyst consumption. This is especially true in the case of an expensive noble metal catalyst, such as palladium. In fact, in "Catalytic Perhydrogenation of Rosin," which employs a palladium-on-carbon catalyst and wood rosin, the authors concluded that to obtain an economical catalyst life the rosin must be purified before use.

Therefore, it is a further object of this invention to provide an economical single step process for the simultaneous partial hydrogenation and sulfur reduction of tall oil rosin without pre-treatment. Further still, since an end product acid number lower than that of the starting material is indicative of decarboxylation, as opposed to hydrogenation, it is an object of this invention process to provide a partially hydrogenated tall oil rosin with minimal acid number reduction.

SUMMARY OF THE INVENTION

Surprisingly, the above stated objects are achieved in the discovered process of selectively reducing the olefinic double bonds of the resin acids of tall oil rosin by treating the tall oil rosin, without pre-treatment, with hydrogen at a temperature of from about 185° C. to about 320° C. and a pressure of at least 800 psig in the presence of a palladium-on-carbon catalyst, either sulfidized or non-sulfidized. The single step, simultaneous partial hydrogenation and sulfur reduction of tall oil rosin is carried out in a batch process preferably at from about 200° C. to 300° C. and from 2000 to 5000 psig. When the invention process is operated continuously, the preferred conditions are from about 220° C. to 270° C. and from 2000 to 5000 psig. The time of hydrogen treatment of the tall oil rosin in the presence of the catalyst should be at least 30 minutes (0.5 hour), although no appreciable benefit is derived from treatment for over 4.0 hours.

BRIEF DESCRIPTION OF THE DRAWING

The drawing shows the process flow diagram of the preferred embodiment of the continuous partial hydrogenation process.

DESCRIPTION OF THE PREFERRED EMBODIMENT(S)

The preferred embodiments are disclosed in the examples to follow.

The tall oil rosin of this invention is typically comprised of the mixture of resin acids shown in Table I.

TABLE I

COMPOSITION OF TALL OIL ROSIN

| Tall Oil Rosin Composition | % of Total Mixture | C=C mole* |
|---|---|---|
| Abietic acid | 44.2 | 2 |
| Dehydroabietic acid | 26.2 | — |
| Isopimaric acid | 10.8 | 2 |
| Palustric acid | 10.0 | 2 |
| Dihydroisopimaric acid | 1.3 | 1 |
| Dihydroabietic acid | 3.7 | 1 |
| Tetrahydroabietic acid | 0.9 | — |
| Pimaric acid | 2.9 | 2 |

*Number of olefinic double bonds in each molecule of acid

Also, typically the tall oil rosin has an acid number of 167 and contains sulfur in the amount of 1000 parts per million.

The batch process experiments reported herein were carried out in a two liter high pressure Autoclave Engineer vessel with a stirrer, a cooling coil and both a "quick heat" element and variable heat element controlled by a thermocouple. The stirrer was operated at a nearly constant rate of approximately 1250 rpm. The procedure consisted of charging the melted tall oil rosin and catalyst into the autoclave, sealing and flushing with nitrogen. The reaction was conducted at various temperatures, catalyst levels and hydrogen pressures.

EXAMPLE 1

A series of tall oil rosin hydrogenation batch reactions were conducted with a 5% palladium on carbon catalyst (5% palladium and 95% substrate) to determine operating condition parameters. The results are given in Table II.

TABLE II

| Sample Number | Temperature °C. | Pressure, psig | Catalyst %* | Percent Hydrogenation | Acid Number | Sulfur, ppm |
|---|---|---|---|---|---|---|
| 1 | 200 | 3000 | 2.0 | 85 | 163 | 346 |
| 2 | 200 | 3000 | 1.0 | 82 | 166 | 620 |
| 3 | 200 | 1500 | 4.0 | 92 | 169 | 424 |
| 4 | 200 | 1500 | 1.0 | 76 | 166 | 643 |
| 5 | 200 | 4500 | 1.0 | 80 | 163 | 660 |
| 6 | 200 | 800 | 4.0 | 89 | 170 | 644 |
| 7 | 200 | 4500 | 3.0 | 90 | 168 | 703 |
| 8 | 270 | 800 | 0.63 | 91 | 167 | 763 |
| 9 | 320 | 2650 | 0.2 | 88 | 163 | 745 |
| 10 | 300 | 4000 | 0.3 | 92 | 165 | 751 |
| 11 | 185 | 3000 | 1.0 | 75 | 170 | 906 |

*Based on the rosin

From these experiments, it was determined that tall oil rosin could be successfully partially hydrogenated with a 5% palladium on carbon catalyst at any combination of the following reaction parameters: temperature, 185°–320° C.; pressure, 800–4500 psig; and 0.01%–4.0% catalyst. The reaction products exhibited reduced sulfur content and acid numbers above 160.

EXAMPLE 2

Since stabilization of the catalysts by "sulfiding," or treatment with sulfur compounds, is reported to give enhanced catalyst lifetime at the expense of activity, tall oil rosin was hydrogenated with a 5% "sulfided" palladium on carbon catalyst according to the procedures in Example 1. The results are shown in Table III.

TABLE III

| Sample Number | Temperature °C. | Pressure, psig | Catalyst %* | Percent Hydrogenation | Acid Number | Sulfur, ppm |
|---|---|---|---|---|---|---|
| 1 | 320 | 4500 | 0.20 | 93 | 167 | 710 |
| 2 | 320 | 800 | 0.20 | 86 | 166 | 887 |
| 3 | 250 | 2650 | 0.20 | 86 | 165 | 939 |
| 4 | 250 | 2650 | 0.20 | 81 | 165 | 875 |
| Starting Rosin | — | — | — | — | 163 | 1025 |

*Based on the rosin

These data indicate that tall oil rosin may also be partially hydrogenated using a sulfided palladium on carbon catalyst.

EXAMPLE 3

The continuous experiments were carried out in a laboratory plant. The flow sheet of this plant is shown in the drawing.

The rosin, already melted, is filled into the feed tank 1 under nitrogen atmosphere. The flow is controlled with the metering pump 2 and 3; the rosin is compressed to the system pressure and, in the pre-heater 4, heated to reaction temperature. At the input of the pre-heater 4 the hydrogen gas, which is compressed with the compressor 5, is regulated by a pressure controlling unit 6 with 10% stoichiometric surplus and monitored by pressure indicator 7. The rosin is then hydrogenated in the fixed bed reactor 8, which has equipment for a thorough mixing of the hydrogen gas with the rosin. The reaction temperature is monitored by temperature indicator 9. The safety devices of the reactor include a rupture disc and a safety valve permitting release through pressure indicator 10.

The product leaving the reactor is separated in the separator 11. The pressure in the separator 11 is controlled by pressure regulator 14 which is responsive to the downstream pressure monitored by pressure indicator 17. The product from the separator 11 is expanded to the storage tank 12 over the level controlling device 13. From there it can be filled in drums or further processed. The waste gas is expanded via pressure regulator 15 into the safety separator 20 in response to downstream pressures monitored by pressure indicator 18. Pressure regulator 18 controls the separator system pressure. The separator 20 has the function of a safety separator in case some rosin is carried over with the gas. Behind this separation, no more heating is required, but it is useful to have this system to prevent a blocking of the waste gas pipe.

The gas is then expanded in a second step through the flow regulator 16, which controls the flow rate of the hydrogen gas in the process as monitored by flow indicator 19. The waste gas is sent to combustion.

All parts of the plant are made of stainless steel. Pipes, valves, pumps, reactor and separators are electrically heated. All handling procedure with rosin was carried out under nitrogen.

Employing the laboratory plant of the drawing and the procedure outlined above, tall oil rosin was continuously partially hydrogenated at the rate of 90 grams rosin per hour and a hydrogen gas flow velocity of 180 liters per hour. The reaction temperature was 200° C. and the reaction pressure was 3000 psig. The catalyst employed was 60.1 grams of 5% sulfided palladium on carbon. The results are reported in Table IV.

TABLE IV

| Sample | Testing Time (hr.) | Conversion of Abietic Acid* (%) | Percent Hydrogenation (%) |
|---|---|---|---|
| a | 2 | 89.2 | 67.6 |
| b | 4.2 | 86.2 | 60.2 |
| c | 7.5 | 82.9 | 53.7 |
| d | 10.0 | 78.6 | 48.7 |
| e | — | — | — |
| f | (pump malfunction) | | |
| g | — | — | — |
| h | 12.5 | 84.0 | 63.8 |
| i | 14.5 | 90.7 | 78.2 |
| j | 16.5 | 95.0 | 78.7 |
| k | 18.75 | 95.7 | 80.6 |
| l | 19.75 | — | — |
| m | 20.5 | 97.9 | 83.9 |
| n | 21.5 | 100.0 | 81.2 |
| o | 24.2 | 100.0 | 83.4 |
| p | 26.2 | 100.0 | 83.6 |
| q | 27.2 | 100.0 | 83.5 |
| r | 29.2 | 98.4 | 76.1 |
| s | 31.2 | 97.7 | 79.2 |
| t | 33.2 | 97.5 | 79.5 |
| u | 34.2 | 96.8 | 78.1 |
| v | 36.2 | 96.7 | 77.5 |
| w | 38.2 | 96.7 | 78.2 |
| x | 40.2 | 97.1 | 78.5 |
| y | 42.2 | 97.4 | 76.6 |
| z | 43.2 | 97.1 | 77.4 |

*Conversion of abietic acid is an indication of saturation of olefinic C═C bonds.

Thus, the partial hydrogenation was operated continuously and efficiently for over 43 hours.

EXAMPLE 4

Using 63.9 grams 0.5% non-sulfided palladium on carbon catalyst, tall oil rosin was continuously partially hydrogenated under conditions similar to Example 3, except the hydrogenation temperature was 233° C. and the rosin throughput was at a rate of 105 grams per hour. These results are shown in Table V.

TABLE V

| Sample | Testing Time (hr.) | Conversion of Abietic Acid* (%) | Percent Hydrogenation (%) | Acid Number |
|---|---|---|---|---|
| a | | | | |
| b | | | | |
| c | 3.75 | 100 | 73.5 | |
| d | 5.8 | 100 | 78.7 | |
| e | 8.3 | 100 | 77.4 | |
| f | 10.3 | 100 | 77.8 | |
| g | 12.3 | 100 | 79.4 | 161.4 |
| h | 14.3 | 99 | 76.4 | |
| i | 16.3 | 99 | 75.0 | |
| j | 18.3 | 100 | 74.2 | |
| k | 20.0 | 100 | 77.0 | |
| l | 22.0 | 100 | 76.5 | |
| m | 24.0 | 98 | 75.2 | |
| n | 26.0 | 100 | 76.4 | 162.11 |
| o | 28.0 | 100 | 73.6 | |
| p | 30.0 | 100 | 73.8 | |
| q | 32.0 | 100 | 73.9 | 163.3 |
| r | 34.0 | 100 | 75.8 | |
| s | 36.0 | 100 | 76.8 | |
| t | 38.0 | 100 | 75.8 | |
| u | 40.0 | 99 | 74.1 | |
| v | 42.0 | 100 | 73.8 | 162.5 |
| w | 44.0 | 100 | 74.3 | |
| x | 46.0 | 100 | 70.3 | |
| y | 48.0 | 100 | 73.0 | |
| z | 50.0 | 100 | 75.1 | 164.0 |
| aa | 52.0 | 100 | 74.8 | |
| ab | 55.3 | 100 | 76.6 | |
| ac | 56.3 | 100 | 79.6 | |
| ad | 58.3 | 100 | 72.2 | 160.3 |
| ae | 60.3 | 100 | 71.2 | |
| af | 61.5 | 100 | 82.2 | |
| ag | 63.5 | 100 | 81.2 | |
| ah | 65.5 | 100 | 78.6 | |
| ai | 67.5 | 100 | 75.3 | 163.0 |
| aj | 70.0 | 100 | 77.4 | |

*Conversion of abietic acid is an indication of saturation of olefinic C═C bonds.

EXAMPLE 5

In batch experiments, the time of opportunity for exposure of the rosin to the catalyst is the reaction time. However, in continuous reactions this exposure, or residence, time is a function of the amount of catalyst in the reactor and the rate of rosin throughput. This is expressed as Weight Hourly Space Velocity (WHSV), which is defined as the mass flow of rosin per hour divided by the mass of catalyst. At temperatures between 220°–270° C. and pressures between 2000–5000 psig using a 0.5% palladium on carbon catalyst, sulfided or non-sulfided, the WHSV should be between 1.0–5.0.

Using a 0.5% sulfided palladium on carbon catalyst, the correlation between hydrogenation temperature, WHSV, percent hydrogenation and acid number was investigated. The results are reported in Table VI.

TABLE VI

| Temperature (°C.) | WHSV | Percent Hydrogenation (%) | Acid Number |
|---|---|---|---|
| 200 | 1.46 | 50 | 167 |
| 230 | 1.46 | 84 | 164 |
| 230 | 1.71 | 77 | 165 |
| 230 | 1.95 | 71 | 166 |
| 250 | 1.71 | 90 | 158 |
| 260 | 3.70 | 57 | 163 |
| 260 | 4.94 | 54 | 163 |
| 280 | 7.1 | 70 | 155 |

The data show that acid number is primarily a function of hydrogenation temperature and only secondarily a function of WHSV. For example, the acid number only slightly decreases (from 166 to 164) when rising from 1.46 to 1.95 WHSV at 230° C. At the same time the degree of hydrogenation is reduced from 84% to 71%.

Interpolation from the data at 230° C. indicates space velocities from about 1.5 to about 1.6 are preferred to produce a product with an acid number of 160 or above and a hydrogenation degree of about 80%.

Furthermore, interpolation from the data at 250° C. and 260° C. indicates a product with a hydrogenation degree of about 80% and an acid number of 160 or above can be achieved at a WHSV of about 2 and a temperature of about 260° C. Therefore, the preferred temperature range for the continuous process is from about 240° C. to about 260° C. to produce a product of sufficient degree of hydrogenation and acid number at the maximum WHSV.

EXAMPLE 6

This example demonstrates that the sulfur content of the product is mainly dependent upon the hydrogenation temperature. The partially hydrogenated tall oil rosin samples reported in Table VII were reacted with 0.5% sulfidized palladium on carbon catalyst at a WHSV of 1.94 and a pressure of 3000 psig.

TABLE VII

| Sample Number | Temperature (°C.) | Sulfur (ppm) |
|---|---|---|
| 1 | 250 | 201 |
| 2 | 250 | 170 |
| 3 | 250 | 166 |
| 4 | 250 | 165 |
| 5 | 250 | 216 |
| 6 | 250 | 181 |
| 7 | 250 | 203 |
| 8 | 250 | 191 |
| 9 | 230 | 810 |
| 10 | 230 | 802 |
| 11 | 200 | 871 |
| 12 | 200 | 862 |
| 13 | 220 | 723 |

The initial sulfur content of the tall oil rosin was 1000 ppm. The results indicate that, when using the temperature from 200° C. to 230° C., the sulfur content is lowered from 1000 ppm to 800–900 ppm; increasing the temperature to 250° C. significantly decreases the sulfur content to values averaging under 200 ppm.

Therefore, the preferred temperature for the reaction is from about 240° C. to about 260° C. to minimize the sulfur content of the product and maximize the life-time of the catalyst.

While the invention has been described and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

What is claimed is:

1. A process for the partial hydrogenation and sulfur reduction of a sulfur-containing tall oil rosin material comprised of a mixture of resin acids so as to selectively hydrogenate the olefinic double bonds of the acids, comprising contacting the tall oil rosin with hydrogen gas in the presence of a catalytically effective amount of a carbon supported palladium metal catalyst at a temperature of from 185° C. to 320° C. and a pressure of at least 800 psig for from 0.5 to 4.0 hours to provide a partially hydrogenated tall oil rosin of reduced sulfur content, based on the starting rosin material, and having an acid number no lower than 160.

2. The process of claim 1 wherein the resin acid mixture is comprised of abietic acid, dehydroabietic acid, isopimaric acid, palustric acid, dihydroisopimaric acid, dihydroabietic acid, tetrahydroabietic acid, and pimaric acid.

3. The process of claim 1 wherein the tall oil rosin is partially hydrogenated in a batch process at a temperature of from about 200° C. to about 300° C. and at a pressure of from about 2000 to about 5000 psig and the catalyst is from 0.01% to 4.0%, based on the tall oil rosin, of 5% palladium on carbon.

4. The process of claim 3 wherein the palladium catalyst is sulfided.

5. The process of claim 1 wherein the tall oil rosin is partially hydrogenated continuously at a temperature of from about 220° C. to about 270° C. and at a pressure of from about 2000 to about 5000 psig and the catalyst is 0.5% palladium on carbon in an amount proportionate to the mass flow of the tall oil rosin such that the weight hourly space velocity of the process is between 1 and 5.

6. The process of claim 5 wherein the temperature is from about 230° C. to about 260° C. and the weight hourly space velocity is from about 1.5 to about 2.

7. The process of claim 5 or 6 wherein the palladium catalyst is sulfided.

* * * * *